Sept. 2, 1924.                                            1,507,428
                        H. W. ROTTEL
                ICE MACHINE OF THE COMPRESSION TYPE
                Filed Sept. 20, 1919     4 Sheets-Sheet 2
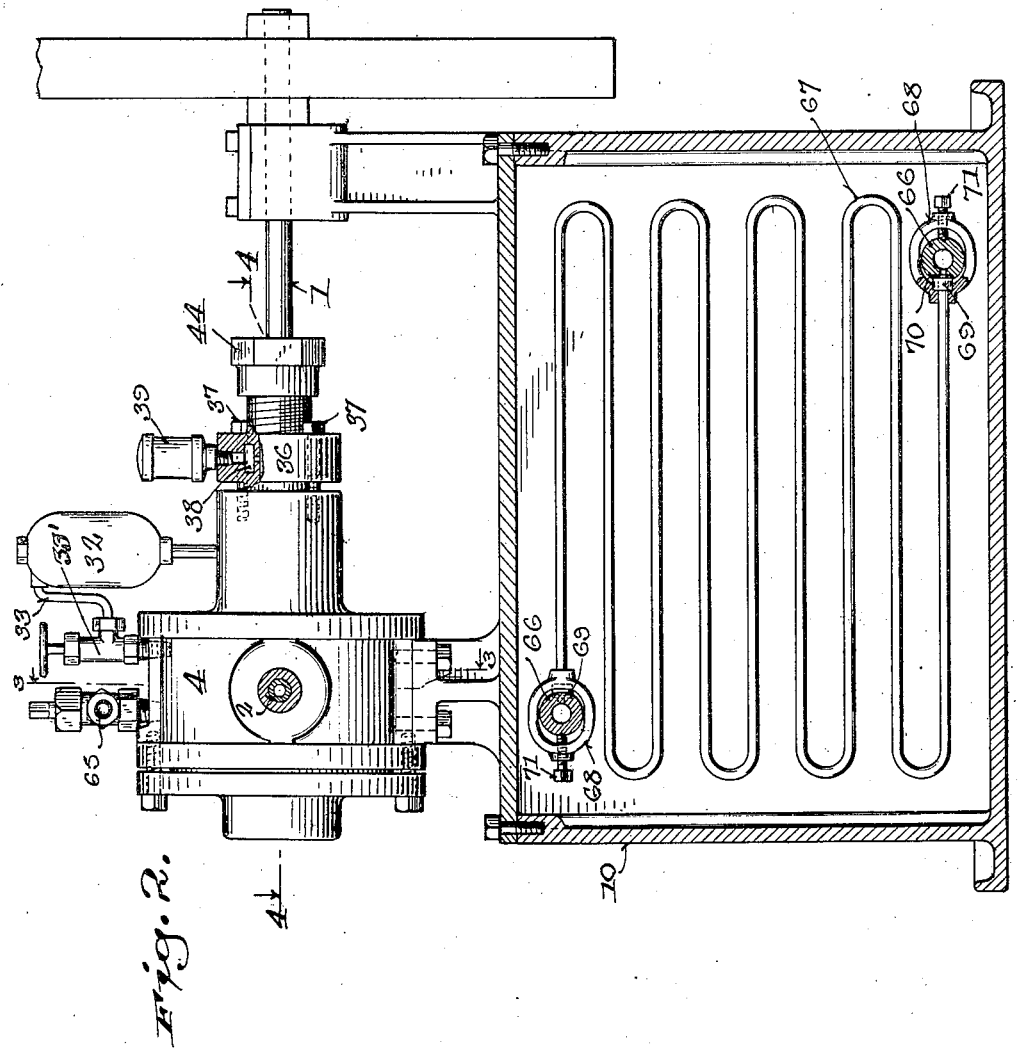
Inventor
Herman W. Rottel
By Louis Quarles
        Attorney

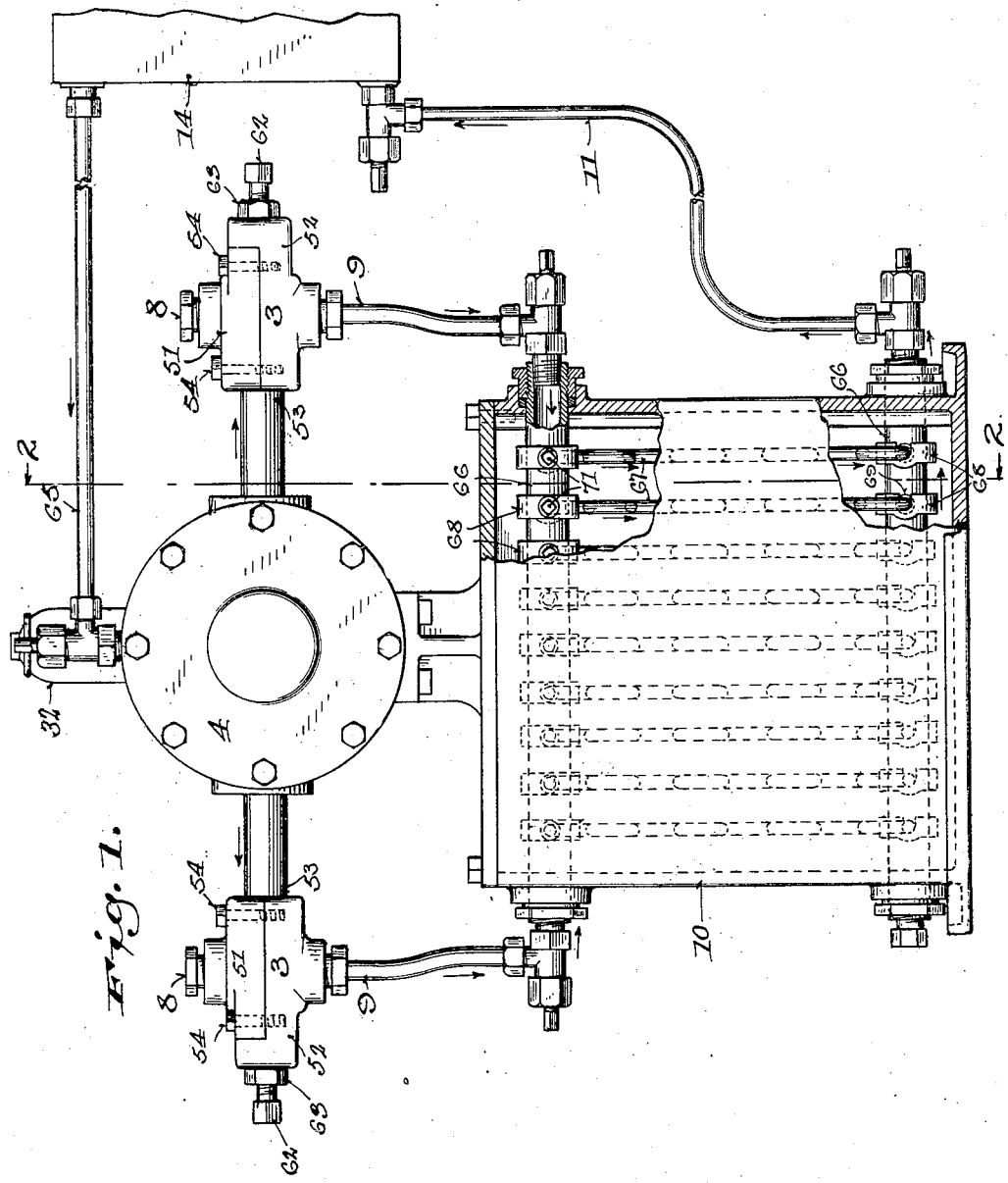

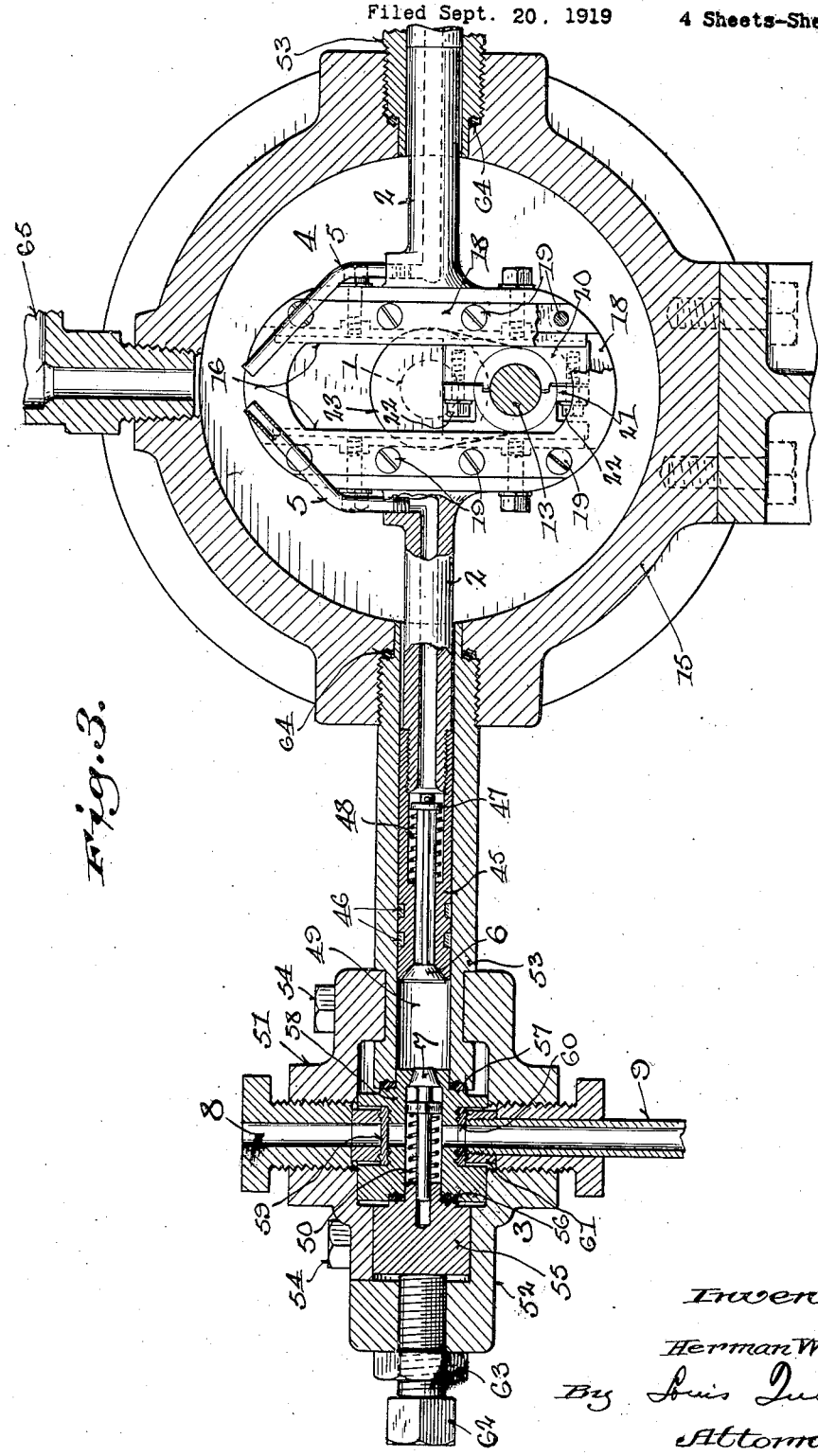

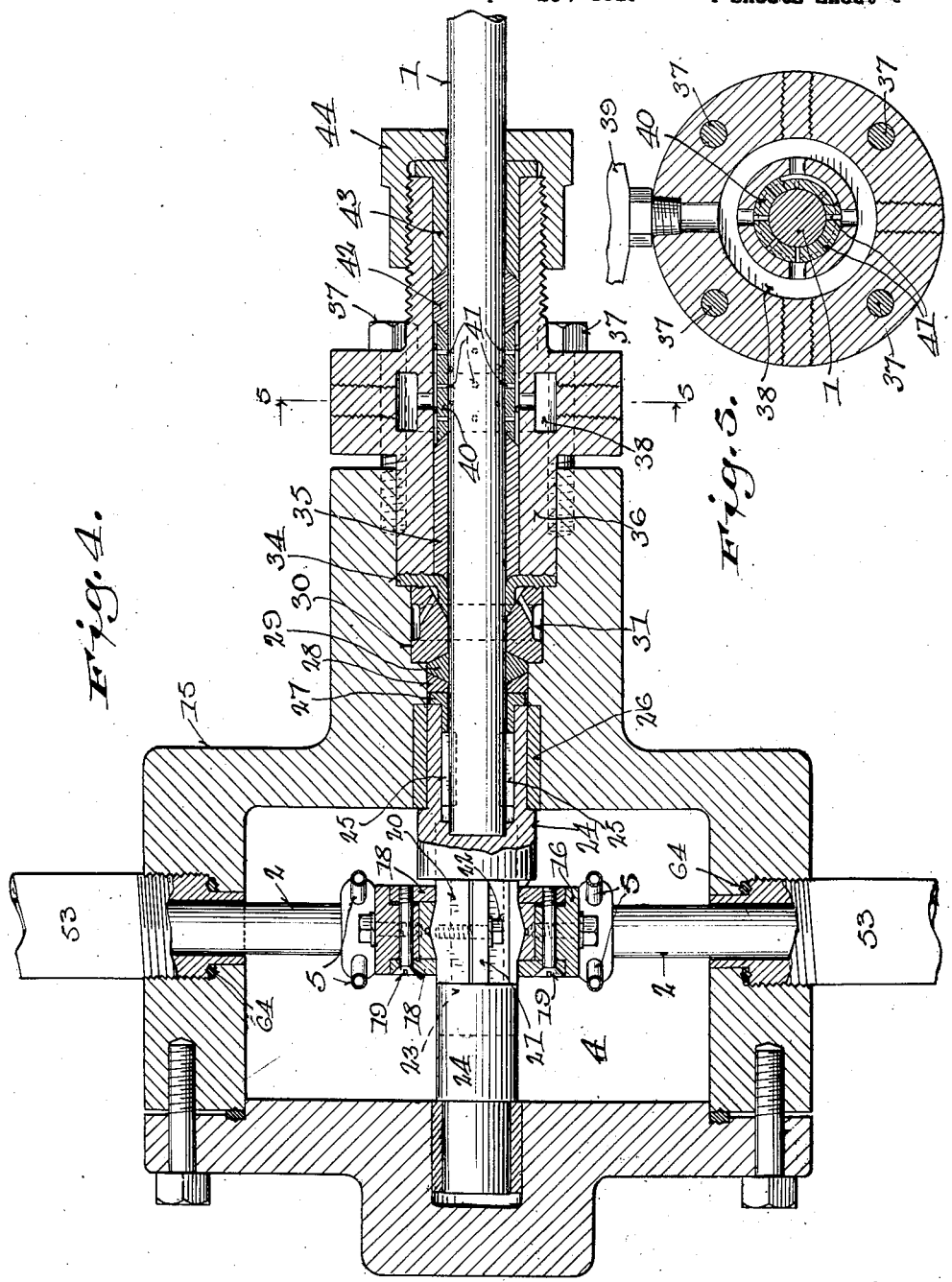

Patented Sept. 2, 1924.

1,507,428

UNITED STATES PATENT OFFICE.

HERMAN W. ROTTEL, OF MILWAUKEE, WISCONSIN.

ICE MACHINE OF THE COMPRESSION TYPE.

Application filed September 20, 1919. Serial No. 325,247.

*To all whom it may concern:*

Be it known that I, HERMAN W. ROTTEL, a citizen of the United States, residing at Milwaukee, county of Milwaukee and State of Wisconsin, have invented certain new and useful Improvements in Ice Machines of the Compression Type, of which the following is a specification.

My invention relates to new and useful improvements in ice machines of the compression type and is particularly adapted for the retention and control of the pressure of the gas used in such ice machines, for providing a means of oiling such machines without the need of frequent attention, and for providing a simple and compact means of constructing such machines.

Ice machines of the compression type now in use have a sliding piston to operate the compressor and provide for the control of the gas pressure so that the gas does not leak out of the ice machine by two principal methods: By keeping the oil used for sealing and lubricating the piston of the compressor under greater pressure than the gas; or by one or more leather or rubber cups, gaskets or rings around the piston of the compressor soaked in glycerine; i. e., either by excess of pressure over gas pressure or by tightly fitting mechanical means. Among the disadvantages of the first method are:

As the oil is under pressure it forces its way throughout the whole system of the machine and must be separated and removed therefrom. A separate oil pump is required to keep the oil under pressure. As the oil is under pressure, the machine requires an attendant to fill the oil cups every three or four hours.

Among the disadvantages of the second method are:

The packing means must be very tight and therefore the wear is rapid on the cups, gaskets or rings used.

The object of my invention is to provide glycerine, oil and packing seals for the rod or shaft projecting through the crank-case of the compressor whereby the pressure on the glycerine and oil seals and the lubricating oil is kept equal to that of the gas in the machine all without the aid of external oil or glycerine pumps. My machine is so devised that it will run without attendance to the oil and glycerine seals or lubricating system for long periods of time. It is also very compact.

With the above and other objects in view, my invention has particular relation to certain novel features of construction, operation and arrangement of parts an example of which is given in this specification and illustrated in the accompanying drawings wherein:

Figure 1, is an end elevation view of the device in place in an ice machine, parts being broken away and parts being shown in section.

Fig. 2, is a side elevation view, partly in section, taken on the line 2—2 of Fig. 1.

Fig. 3, is a partial vertical sectional view through the crank-case and one of the cylinders of the compressor taken along the lines 3—3 in Fig. 2 looking in the direction of the arrows.

Fig. 4, is a detail horizontal sectional view through the crank-case of the compressor taken along the line 4—4 in Fig. 2 looking in the direction of the arrows.

Fig. 5, is a detail vertical sectional view through the shaft-oiling means taken along the line 5—5 in Fig. 4 looking in the direction of the arrows.

1, is a rotating drive rod driven by power applied thereto, and driving the piston rods 2; working in the cylinders of the compressors 3 connected with the crank chamber 4. 5 is a tube for taking gas out of the crank chamber 4 above the oil level. 6 is an intake valve of the compressor 3 controlling passage of refrigerant from the tube 5 through piston 2 to the compressor and 7 is a discharge valve of the compressor 3. 8 is a hollow plug and 9 is a discharge pipe which carries the gas to the condensor 10 from which the liquid resulting from the rapid expansion of the compressed gas goes through pipe 11 to the expansion coils located in a chamber 14 and from thence through pipe 65 into the crank chamber 4. The crank chamber 4 is enclosed by casing 15. The crank chamber 4 is filled with oil up to the bottom of the piston rods 2. 16 is a Scotch yoke. The drive rod 1 and the piston rods 2 are operatively connected together by means of two steel frames 18 bolted together and to the yoke by bolts 19 and being provided with shims to take up the lost motion of the slide bearing and by the bearing box slidably mounted in the yoke and comprised of two pieces of metal 20 and 21 clamped together over the crank pin 13 by bolts 22. 23 is a crank which is forged in one piece with the crank shaft 24. The crank 23 in motion reciprocates the slide bearing and the bearing box 20 and 21 which in turn presses against the Scotch yoke 16 which operates the piston rods 2, which operate the compressors 3.

The crank-shaft 24 is journalled in a bearing 26 and is connected to the drive-rod 1 by two keys 25. A thrust bearing 27 prevents longitudinal movement of the rod 1. Beyond the bearing 27 is a stuffing-box to hold a flexible packing 29 to keep glycerine from entering the crank-chamber, said packing being confined between a seat ring or follower 28 adjacent the bearing 27 and a lantern 30 surrounding the drive rod 1 and in which is formed the glycerine chamber or ducts 31. The glycerine is under the same pressure as the gas in the crank-chamber 4 as the glycerine is supplied from the glycerine cup 32, shown in Fig. 2, which connection has a regulating valve 33' therein. Cooperating with the lantern 30 is a cup 34 of leather or other pliable material and a flexible shaft-packing 35, in end-thrust engagement with said cup 34, is mounted in a stuffing-box gland 36 which also clamps the cup 34 in place, said gland being secured to the crank-case by four bolts 37.

Within the gland 36 is an oil chamber 38 supplied with oil from an oil cup 39, Fig. 2, which cup is threaded into said gland. The oil in the cup 39 is under gravity pressure. A bronze lantern 40 surrounds the shaft or rod 1 and is interposed between the packing 35 and flexible packing 42. This lantern 40 is provided with numerous perforations 41 by means of which the oil from the chamber 38 comes to the drive-rod 1 and lubricates said rod and the packings 35 and 42. This oiling device is shown in detail in Fig. 5. As the oil from the cup is used a vacuum space is created in the oil cup and in the event that any gas leaks along the drive-rod 1, in case the glycerine cup 32 should be empty, the gas would pass into the oil cup to fill the vacuous space therein and as soon as the pressure of the gas along the shaft and in that part of the oil space not filled with oil becomes balanced, then oil will be forced through the packing 42 past the tightening gland 43 and thereby indicate that the glycerine cup 32 is empty and thus give warning of the gas leakage. A threaded collar 44 on the stuffing-box gland 36 cooperates with the gland 43 to tighten the entire packing means just described.

In Fig. 3 the details of one of the compressor cylinders are shown and include the following parts: 8 a hollow bushing securing the safety gasket 59 in place; 9 a discharge pipe leading to the condenser 10, 6 an intake valve, which is movably mounted in the piston head 45 into which is threaded the piston rod 2; 7 is a discharge valve; and 46 is a piston ring to stop gas leakage. The piston head 45 and the piston rod 2 are hollowed out to form a continuation of intake tube 5. 47 is a washer secured by a cotter pin to hold the spring 48 in place which spring 48 holds the intake valve 6 against its seat.

In operation the crank 23 moves the piston rod 2 so that the piston head 45 is forced into the cylinder bore 49 where the gas is compressed, when the pressure therein reaches a sufficient strength, a predetermined compression, it opens the discharge valve 7 by compressing a spring 50 held in place by a guide on the discharge valve 7 thereby letting the gas out through the discharge pipe 9.

This compressor cylinder head is arranged in a simple and compact manner and can be formed of but two castings and is easily assembled and disassembled.

The construction is as follows:

51 is one-half and 52 is the other half, said halves clamping over the cylinder 53 and are held together by four screws or bolts 54; 55 is a block of metal drilled out to receive the stem of the discharge valve 7 and holds the spring 50 and the gaskets 56 and 57 in place; 58 is a block of metal drilled out to receive the discharge valve 7; 59 is a safety gasket of metal; 60 is a gasket which is fitted in where the discharge pipe 9 is screwed on to the block of metal 58 to make a gas tight joint; 61 is a collar for gasket 60; 62 is a set screw and 63 is a locknut to hold the metal blocks 55 and 58 against the gaskets 56 and 57 and the cylinder 53. The end of the cylinder 53 opposite from the end fastened in the compressor 3, Fig. 1, is threaded into casing 15 and 64 is a gasket to make a gas tight joint.

Having particular reference to Fig. 2, 66 is a header into which the top and bottom of the condenser coils 67 are fastened by means of clamps 68 which receive the collar 69 which is screwed on the condenser coils 67. Between the header 66 and the collar 69 is the packing 70; 71 is a set screw to tighten this joint. This makes a simple gas tight joint which can easily be assembled and disassembled.

In operation the drive rod 1 rotates and by means of the crank 23 reciprocates the Scotch yoke 16 and the piston rods 2 of the compressors 3, each of which in turn takes in the gas through the tube 5 and the intake valve 6 and compress it in the cylinder bore 49, from which the compressed gas goes through the discharge valve 7 and the discharge pipe 9 into the condenser 10 where the gas is liquefied and from thence through pipe 11 into the expansion coils in the chamber 14, and back through pipe 65 into the crank chamber 4.

In order to control and retain the pressure of the gas my invention uses a "balanced sealing action" which operates as follows:

The gas which leaks from the crank chamber 4 along the crank shaft 24 or the drive rod 1 will be held back by the leather cup 34 around drive rod 1 which leather cup 34 is kept moistened and kept pressed against the drive rod 1 by glycerine supplied from the glycerine cup 32 through the glycerine chambers, ducts or seals 31. The pressure per unit of area on the glycerine and the leather cup 34 is equal to that of the gas seeking to escape from the crank chamber 4 due to the fact that pipe 33 connects the glycerine cup 32 with the crank chamber 4 and thereby equalizes the pressure on the glycerine and the gas in the crank chamber 4.

It is to be noted that the leather cup 34 has its free edge beveled, the bevel being cut away from the shaft 1 and the lantern 30 has a corresponding bevel, being cut toward the shaft 1, the flexible packing 35 being under pressure from the stuffing box gland 36, tends to force the leather cup 34 parallel to and along the shaft 1, and thus forces the beveled edge thereof into the tapered recess formed between the beveled edge of the lantern 30 and the shaft 1. The pressure of the glycerine which goes through a perforation in lantern 30 presses downwardly on the leather cup 34 tending to compress it against the shaft 1, this force is exerted normal to the surface of the cup and to the surface of the shaft. The resultant of these two actions is to force the leather cup 34 tightly down and along the shaft 1, thus making a fluid tight seal.

It is apparent that the external effective area of the leather cup 34 that is exposed to the pressure of the glycerine, is greater than the interior effective area thereof. By effective area I mean the superficial area that is exposed to the direct fluid pressure normal to the surface. The leather cup 34 being of substantial thickness, the external superficial area exposed to the pressure of the glycerine is greater than the interior superficial area similarly exposed to pressure, this results in an unbalanced inward or centrifugal component, which is universally distributed all around the crank shaft 1 and is normal thereto, and the result is an equal homogeneous inward pressure of the leather cup 34 around the crank shaft 1, making a tight seal. The unbalanced component is in all cases normal to the exterior surface of the leather cup 34, and being determined by the projected area thereof and is independent of surface irregularities, and results in a uniformly evenly applied seal.

This sealing effect just described is reinforced by the longitudinal pressure of the compressible packing 35 on the cup 34. The pressure exerted by the packing 35 parallel to the surface of the shaft 1, forces the beveled edge of the leather cup 34 into intimate contact with the beveled edge of the lantern 30, and this operates to turn the pressure through a right angle, thus resolving it into pressure normal to the surface of the shaft 1, and adds it to the pressure already exerted by the glycerine.

In the event that the glycerine cup should become empty any gas leaking past the leather cup 34 packing 35 would pass through the perforations 41 in the lantern 40 up into the oil chamber 38 and into the oil cup 39 which oil cup 39 is filled in the usual manner by removing the stopper, pouring oil therein and then replacing the stopper which is screwed tightly into position. The body of the oil cup is preferably made of glass or other equivalent transparent material so that the leaking gas bubbling up into the cup is readily visible as previously explained. The oil will be also forced out along the drive rod 1 as previously described and would thereby indicate that the gas was leaking. When the glycerine cup 32 is filled and there is no gas leakage the oil in the oil cup 39 is under gravity pressure and by means of the perforations 41 oils the drive rod 1 and the flexible packings 35 and 42. A regulating valve 33', of well known construction, is located in the pipe line 33.

While I have shown and described the packing in connection with a rotary shaft, it may be used without any change on a reciprocating rod or member, and I therefore desire it to be understood that the expression "rod" as used in the claims designates either a reciprocating or rotary member.

Having thus fully described my invention, I claim:—

1. A rod seal comprising a chamber surrounding the rod to be sealed, a flexible sealing member within said chamber surrounding and in contact with said rod and having one edge thereof beveled away from the rod, a fixed member abutting the flexible sealing member and having the edge thereof in contact with said flexible sealing member and beveled toward the rod, and means including a sealing fluid for applying pressure to the flexible sealing member for forcing the same into intimate contact with the rod and with the beveled edge of the fixed member 2. A rod seal comprising a chamber surrounding the rod to be sealed, a flexible sealing member within said chamber surrounding and in contact with said rod and having one edge thereof beveled away from the rod, a fixed member abutting the flexible sealing member and having the edge thereof in contact with said flexible sealing member beveled toward the rod, means for applying fluid pressure to the external side of the flexible sealing member normal to the surface of the rod, and means for applying pressure to the flexible sealing member parallel to the surface of the rod.

3. A rod seal comprising a flexible cup surrounding the rod to be sealed and having one edge thereof beveled toward the rod, a stuffing box surrounding said shaft and cup and forming a chamber therearound, a lantern within said chamber and having one edge thereof beveled toward the rod and containing a perforation, an elastic packing surrounding the rod and contained within the said stuffing box and abutting on the non-beveled portion of the cup, means for applying pressure to the elastic packing parallel to the rod, and means for applying fluid pressure between the cup and lantern thereby forcing the cup between the rod and lantern and forming a fluid tight seal for the rod.

4. A rod seal comprising a stuffing box surrounding the rod to be sealed, a flexible sealing member within said stuffing box and surrounding said rod and in contact therewith and having an external effective surface exposed to fluid pressure of substantially greater area than the internal effective surface, and means for applying fluid pressure to the exterior effective surface of the sealing member, thereby causing the same to press uniformly upon the rod and making a fluid tight seal.

5. A rod stuffing box including a flexible cup surrounding said rod to be sealed and having a flexible edge portion, a lantern having abutting engagement with the flexible edge portion of said cup, means for applying fluid pressure to the exterior of said cup, and means for applying pressure longitudinally of the cup to maintain said edge portion of said cup in abutting engagement with said lantern.

6. A rod stuffing box including a flexible cup surrounding said rod to be sealed, a lantern, the sealing portion of said cup having wedging engagement with said lantern, means for applying fluid pressure to the exterior of said cup, and means for applying pressure longitudinally of the cup to maintain said sealing portion in wedging engagement with said lantern.

HERMAN W. ROTTEL.

Witnesses:
 MAE J. BOLLENBACH,
 HOWARD A. HARTMAN.